US009845229B1

(12) United States Patent
Wade et al.

(10) Patent No.: US 9,845,229 B1
(45) Date of Patent: Dec. 19, 2017

(54) APPARATUS FOR REMOTELY LIFTING A BURIED EXPLOSIVE DEVICE

(71) Applicant: The United States of America as represented by the Department of the Navy, Washington, DC (US)

(72) Inventors: James Wade, Waldorf, MD (US); Matthew Gebstadt, King George, VA (US); Mike Sharp, King George, VA (US); Lee Foltz, Indian Head, MD (US); Angel Diaz, Indian Head, MD (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/999,362

(22) Filed: Apr. 29, 2016

(51) Int. Cl.

| | |
|---|---|
| ***B66F 19/00*** | (2006.01) |
| ***B66C 1/34*** | (2006.01) |
| ***F41H 11/12*** | (2011.01) |
| ***B66F 11/00*** | (2006.01) |
| *F16M 11/20* | (2006.01) |

(52) U.S. Cl.
CPC ................ *B66F 19/00* (2013.01); *B66C 1/34* (2013.01); *B66F 11/00* (2013.01); *F41H 11/12* (2013.01); *F16M 11/2014* (2013.01)

(58) Field of Classification Search
CPC ..... A22C 15/00; F16M 11/2014; B66F 11/00; B66F 19/00; B66F 2700/00; B66F 2700/09; B66C 1/34; B66C 23/18; F41H 11/12
USPC ........ 452/187, 127, 158; 248/371, 398, 146, 248/148, 188.1, 188.2, 163.1, 163.2, 248/440.1, 346.03, 157, 295.11
See application file for complete search history.

(56) References Cited

U.S. PATENT DOCUMENTS

| | | | | |
|---|---|---|---|---|
| 1,461,650 A | 7/1923 | Falzer et al. | | |
| 2,343,014 A | 2/1944 | Langan | | |
| 4,026,522 A * | 5/1977 | Dranselka | B66F 19/00 | 254/132 |
| 4,482,182 A * | 11/1984 | Mortensen | B66F 19/005 | 254/131 |
| 4,522,000 A * | 6/1985 | Barari | E02D 27/34 | 248/228.3 |
| 4,570,423 A * | 2/1986 | DeLong | B65B 25/02 | 248/97 |
| 4,905,391 A * | 3/1990 | Dillon | E01F 9/688 | 248/168 |
| 4,913,388 A * | 4/1990 | McCant | A63B 63/083 | 248/123.11 |
| 5,090,072 A * | 2/1992 | Gray | A61G 7/1019 | 5/86.1 |

(Continued)

*Primary Examiner* — Nkeisha Smith
(74) *Attorney, Agent, or Firm* — Fredric J. Zimmerman

(57) ABSTRACT

An apparatus for lifting a buried explosive device includes a T-shaped base including a flange member and a web member. The web member has one end fixed at a right angle to the midpoint of the flange member. A vertical upright member is fixed at one end to the midpoint of the flange member. A diagonal member is fixed at one end to the other end of the vertical upright member and fixed at another end to a second end of the web member that is distal the flange member. The vertical upright member is at least twice a length of the web member. The flange member, the web member, the vertical upright member and the diagonal member are L-channel members made of carbon fiber.

13 Claims, 7 Drawing Sheets

(56) References Cited

U.S. PATENT DOCUMENTS

| | | | | | |
|---|---|---|---|---|---|
| 5,979,603 | A * | 11/1999 | Woller | A45F 3/26 | 182/135 |
| 6,089,809 | A * | 7/2000 | Dellinger | E04G 21/16 | 212/901 |
| 6,171,540 | B1 * | 1/2001 | Ibaragi | B29C 45/00 | 248/200 |
| 6,561,367 | B2 * | 5/2003 | Eaton | B66C 23/48 | 212/202 |
| 6,663,062 | B1 * | 12/2003 | Chapin | F16M 11/38 | 108/56.1 |
| 6,712,655 | B1 * | 3/2004 | Schlemmer | B63H 21/305 | 440/111 |
| 7,059,956 | B1 | 6/2006 | Summerlin | | |
| 7,485,032 | B1 * | 2/2009 | Hogue | A22B 5/06 | 452/187 |
| 2005/0284045 | A1 * | 12/2005 | Smith | E04B 1/7046 | 52/204.2 |
| 2007/0175134 | A1 * | 8/2007 | Christenson | E04H 12/10 | 52/292 |
| 2008/0152442 | A1 * | 6/2008 | Barrett | B23B 47/281 | 408/1 R |
| 2008/0237415 | A1 | 10/2008 | Michalec | | |
| 2010/0116951 | A1 * | 5/2010 | Bifulco | A62C 13/78 | 248/146 |
| 2012/0321416 | A1 * | 12/2012 | Nobles | B66C 1/18 | 414/23 |
| 2014/0263935 | A1 * | 9/2014 | Coster | B66F 1/06 | 248/676 |

* cited by examiner

APPARATUS FOR REMOTELY LIFTING A BURIED EXPLOSIVE DEVICE

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The invention relates in general to explosive ordnance disposal, and in particular to the removal of explosive devices that are buried in the ground.

BACKGROUND OF THE INVENTION

Explosive ordnance disposal (EOD) personnel (operators) are often required to carry the necessary EOD tools on their person for a long distance. This requirement may arise because the EOD work area is not easily accessible to vehicles or because vehicles are not available or for other reasons. In any event, the EOD tools and equipment must be small in size (or easily disassembled into a small size) and small in weight to enable carriage by an EOD operator.

In the case of buried explosive threats, the EOD operator often removes the explosive threat from the ground before disarming or otherwise neutralizing the threat. The explosive threat may be manually removed from the ground. Manual excavation may be accomplished by digging around the explosive threat using an ice ax, pick, shovel, human hands, probe, etc. These methods have a high risk of injury or death to the OED personnel. Thus, a method of removing the explosive threat from the ground where the OED operator is remote from the explosive threat is desired.

Many devices are known for lifting objects remotely from the ground, but most of the known devices are large and heavy and are not man-portable by one person. There are some known, man-portable remote removal devices. These conventional remote removal devices include tripods that are erected over the buried explosive device. First, a portion of the explosive device is manually uncovered. A lanyard or other connector (for example, a connector from a Hook and Line (HAL) EOD kit) is fixed at one end to the explosive device. The other end of the connector is fixed to the hub of the tripod or fed through a pulley that is fixed to the hub of the tripod. A pull line is connected to the hub of the tripod or to the connector that feeds through the pulley. The pull line is remotely pulled by one or more OED operators to lift the explosive device from the ground. In the case of an explosive device weighing up to 400 pounds, the conventional devices mechanically fail and do not lift the explosive device out of the ground.

A need exists for an apparatus and method for remotely lifting explosive devices from the ground.

SUMMARY OF THE INVENTION

It is an aspect of the invention to provide an apparatus for lifting a buried explosive device. Advantageously, the L-channel members will nest together to save pack space. Another advantage of apparatus 10 is the ability to configure the various L-channel members in other configurations that are useful to EOD operators, for example, a stand-off stick or disrupter stand.

The invention will be better understood, and further objects, features, and advantages thereof will become more apparent from the following description of the exemplary embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE INVENTION

Figure 7:
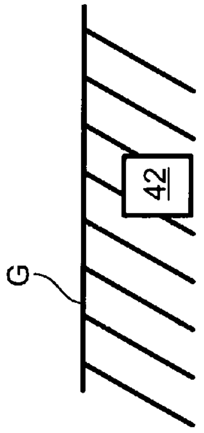
FIG. 7 is a schematic of a buried explosive device.

Referring to FIGS. 1-6, an apparatus 10 for removing a buried explosive device 42 (FIG. 7) includes a T-shaped base 12 having a flange member 14 and a web member 16. The web member 16 has one (first) end 22 fixed at a right angle to the midpoint 44 of the flange member 14 to form the T-shaped base 12. A vertical upright member 18 is fixed at one (first) end to the midpoint 44 of the flange member 14 and is normal to the plane of the T-shaped base 12. The vertical upright member 18 has a second end 24 that is distal the T-shaped base 12. A diagonal member 20 has a first end fixed to the second end 24 of the vertical upright member 18 and is fixed at its second end to a second end 26 of the web member 16 that is distal the flange member 14.

In an exemplary embodiment, the vertical upright member 18 is at least twice the length of the web member 16. Particularly, the vertical upright member 18 is about 2.3 times the length of the web member 16. The flange member 14 may be about the same length as the web member 16. The difference in length between the vertical upright member 18 and the web member 16 produces a mechanical advantage when lifting explosive device 42. This configuration is so because apparatus 10 functions as a lever having the form of a truss. The fulcrum of the lever is the midpoint 44 of flange member 14.

The flange member 14, the web member 16, the vertical upright member 18 and the diagonal member 20 are, for example, L-channel members made of carbon fiber. The vertical upright member 18 may be made of at least two sub-members 18*a*, 18*b* and the diagonal member 20 may be made of at least two sub-members 20*a*, 20*b*. The sub-members 18*a*, 18*b* and 20*a*, 20*b* may be connected together with fasteners 32, such as threaded bolts and nuts. Fasteners 32 may be inserted in openings in the sub-members.

Apparatus 10 may be strengthened with a first brace 28 that extends at an angle from the vertical upright member 18 to one side of the flange member 14. In addition, a second brace 30 may extend at an angle from another side of the flange member 14 to the web member 16. Brace 30 is in the plane of the T-shaped base 12. The first brace 28 and second brace 30 are fixed to flange member 14 on opposite sides of vertical upright member 18. Braces 28 and 30 may be fixed at their respective ends to the other members using, for example, fasteners 32, such as bolts and nuts. Braces 28 and 30 are, for example, L-channel members made of carbon fiber.

Figure 1:
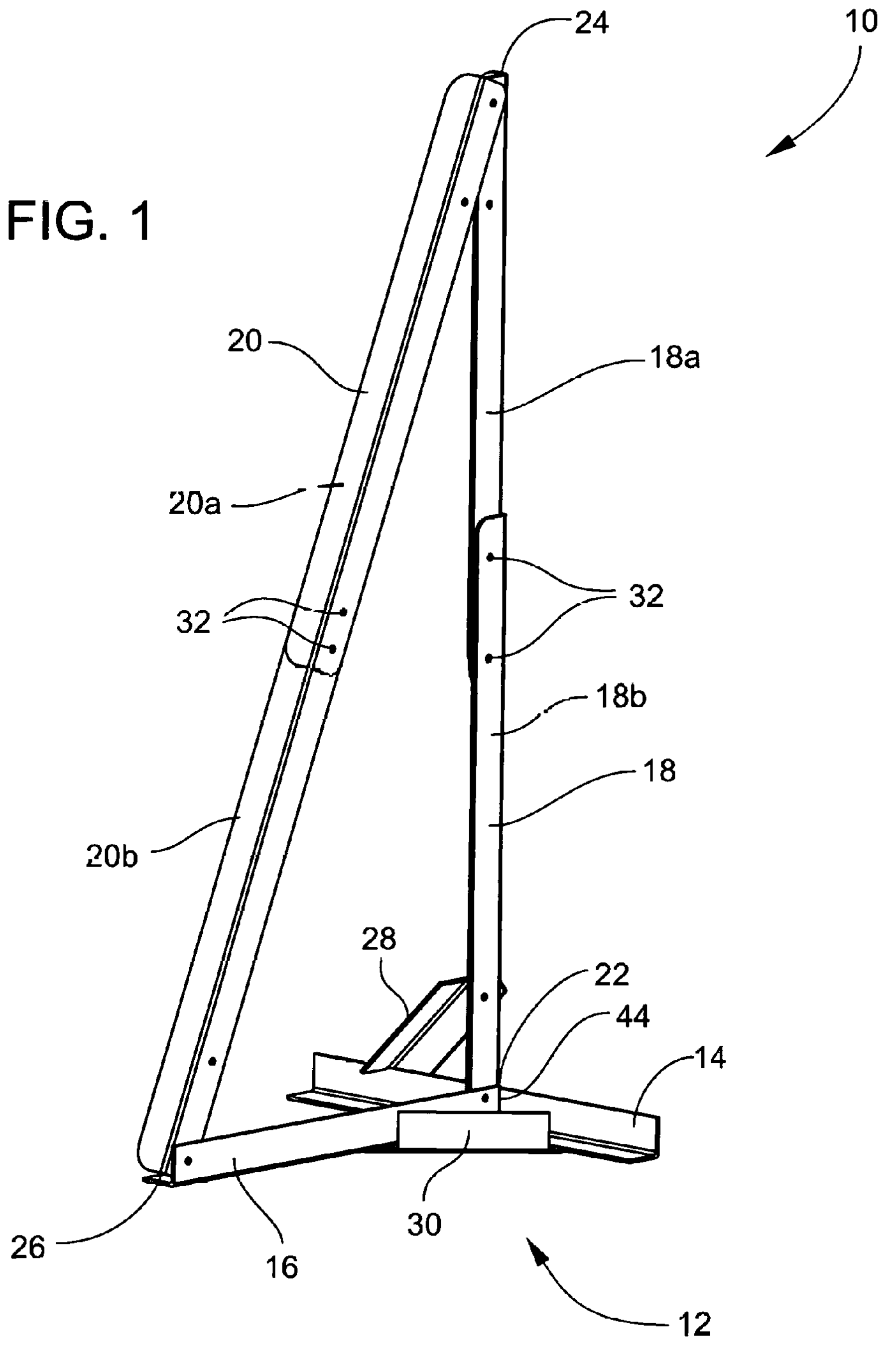
FIG. 1 is a perspective view of one exemplary embodiment of an apparatus for remotely lifting a buried explosive device.
Figure 2:
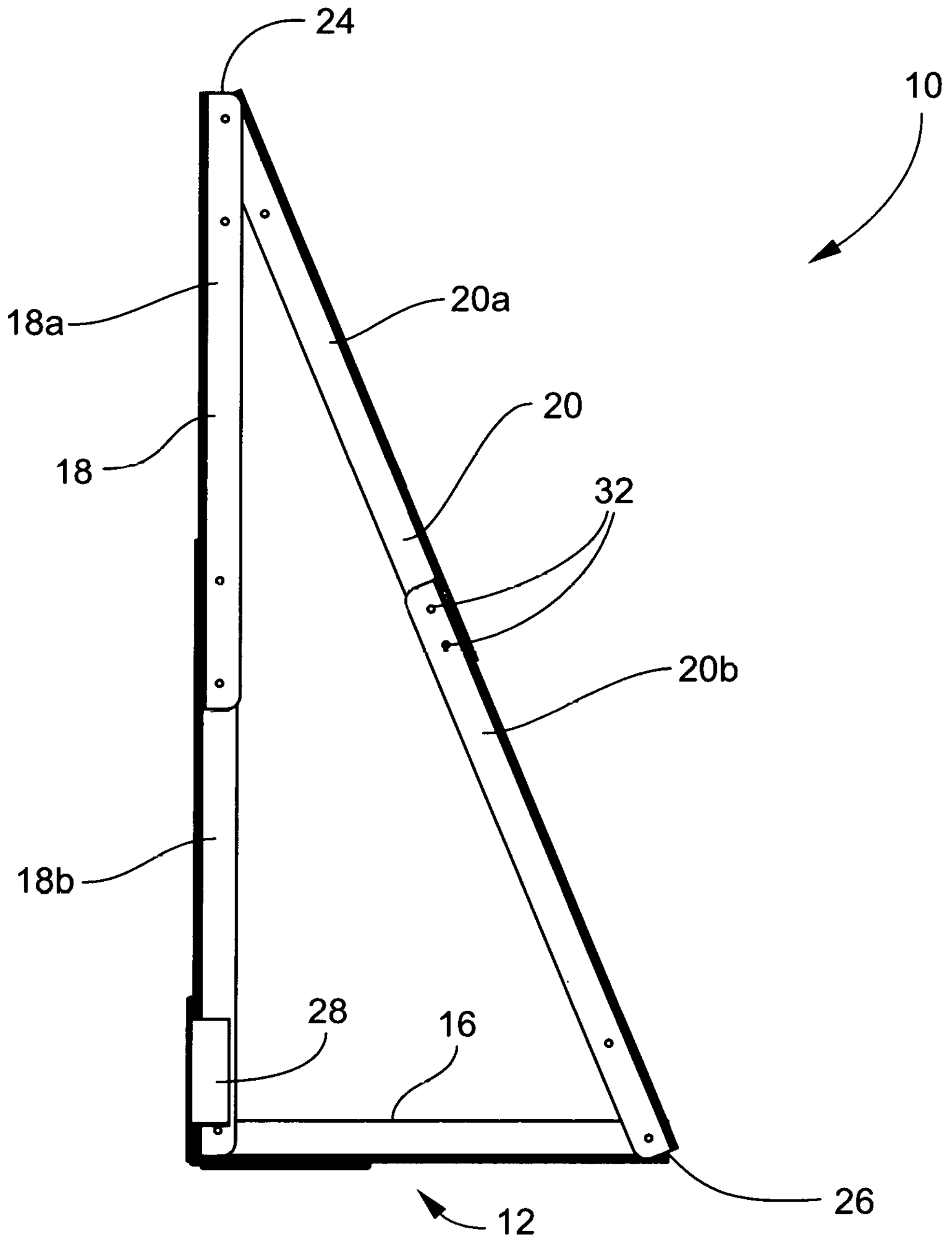
FIG. 2 is a left side view of FIG. 1.
Figure 3:
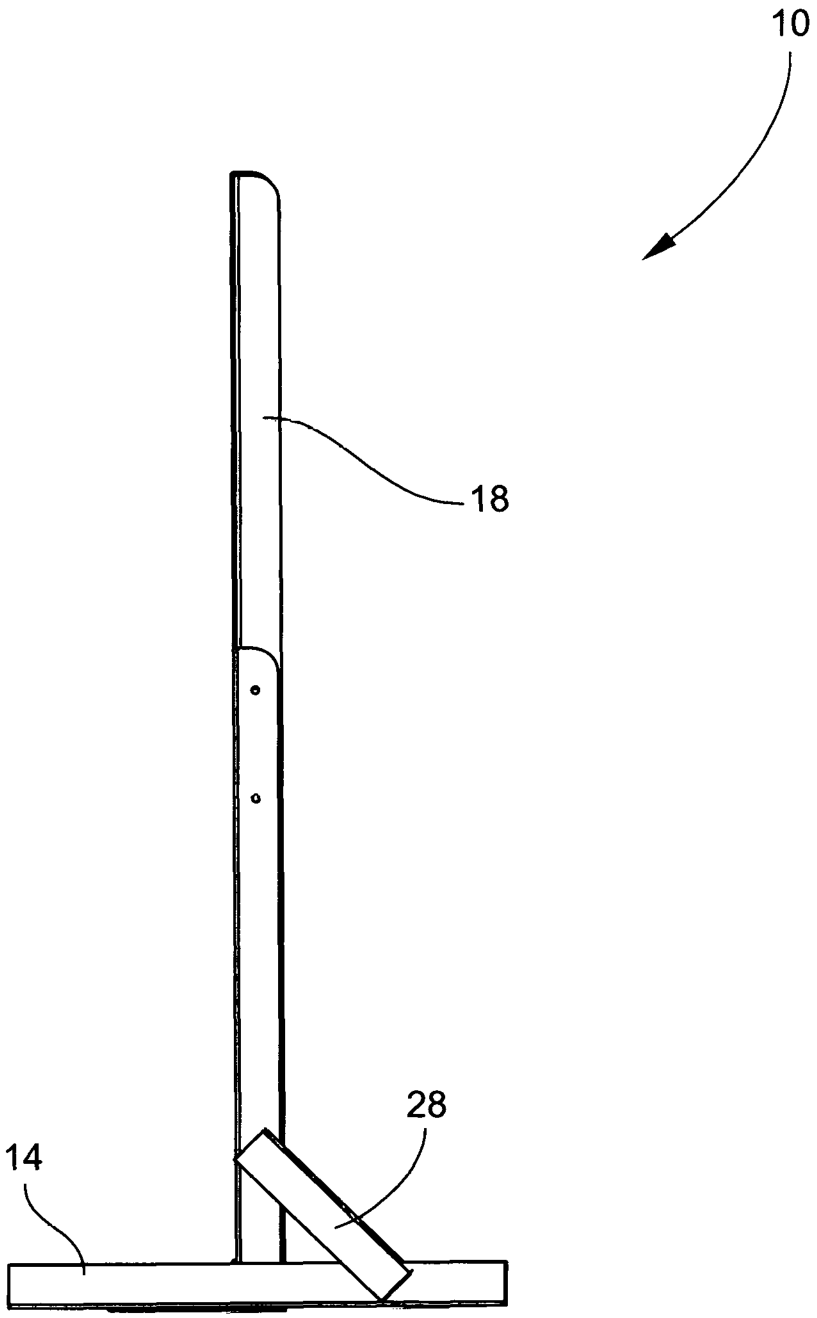
FIG. 3 is a rear view of FIG. 1.
Figure 4:
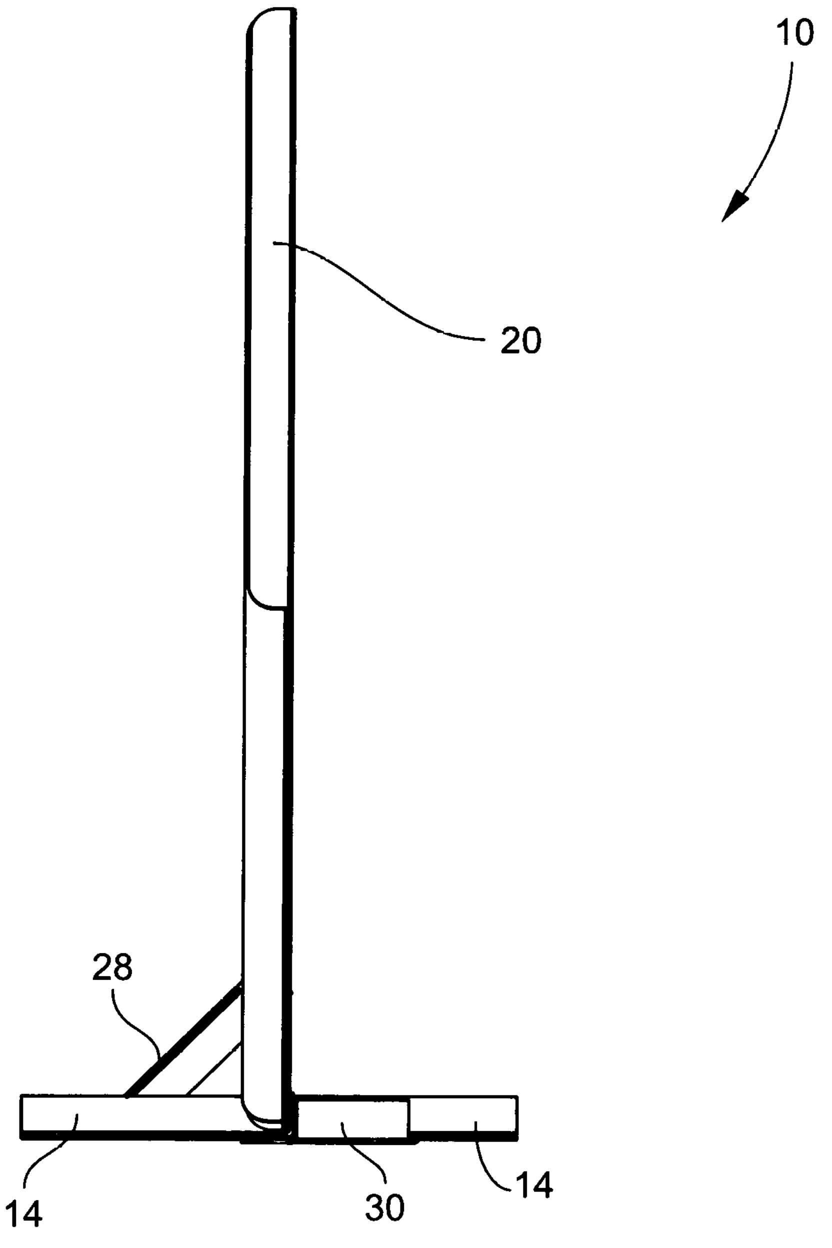
FIG. 4 is a front view of FIG. 1.
Figure 5:
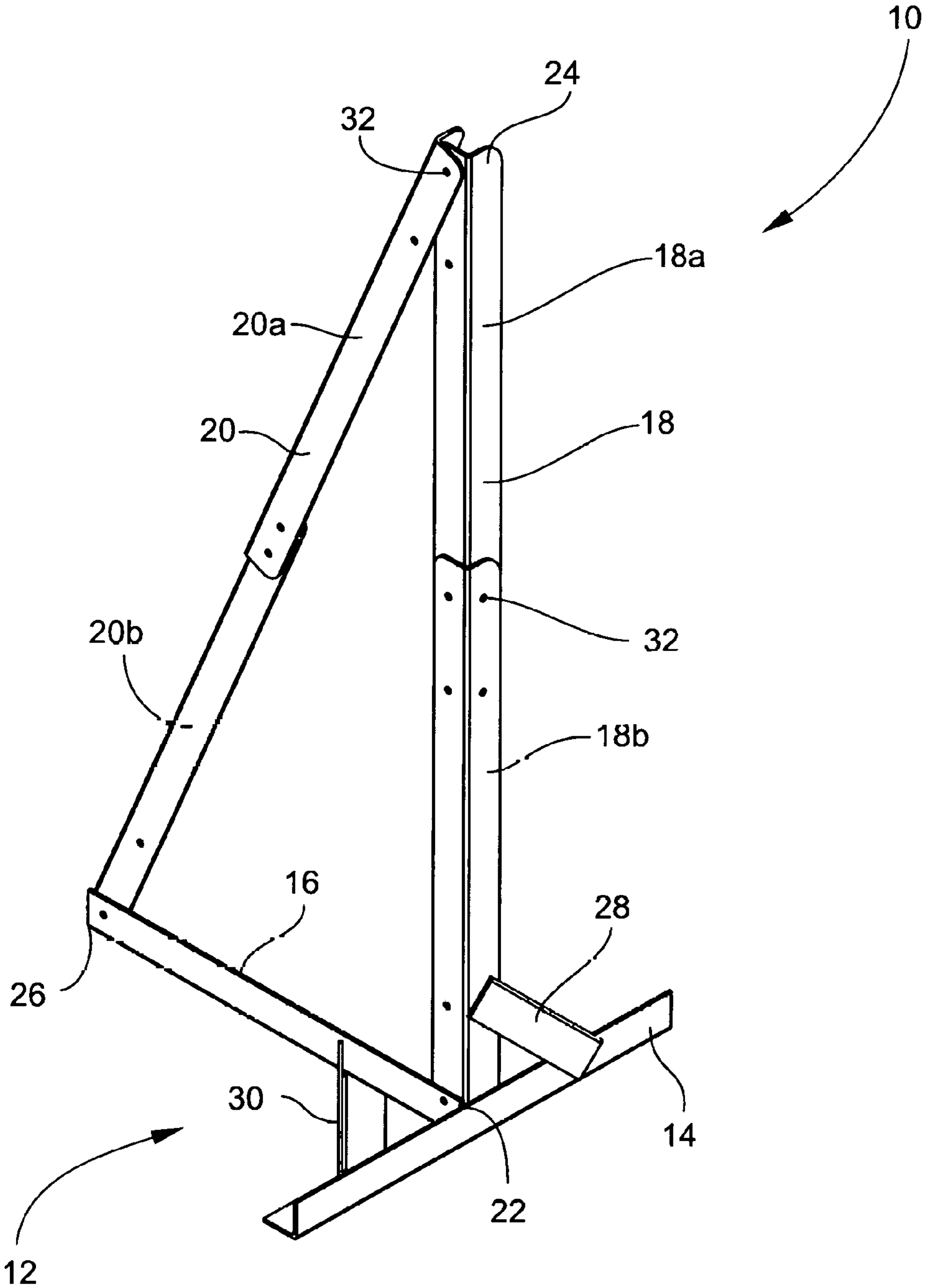
FIG. 5 is another perspective view of the apparatus of FIG. 1.
Figure 6:
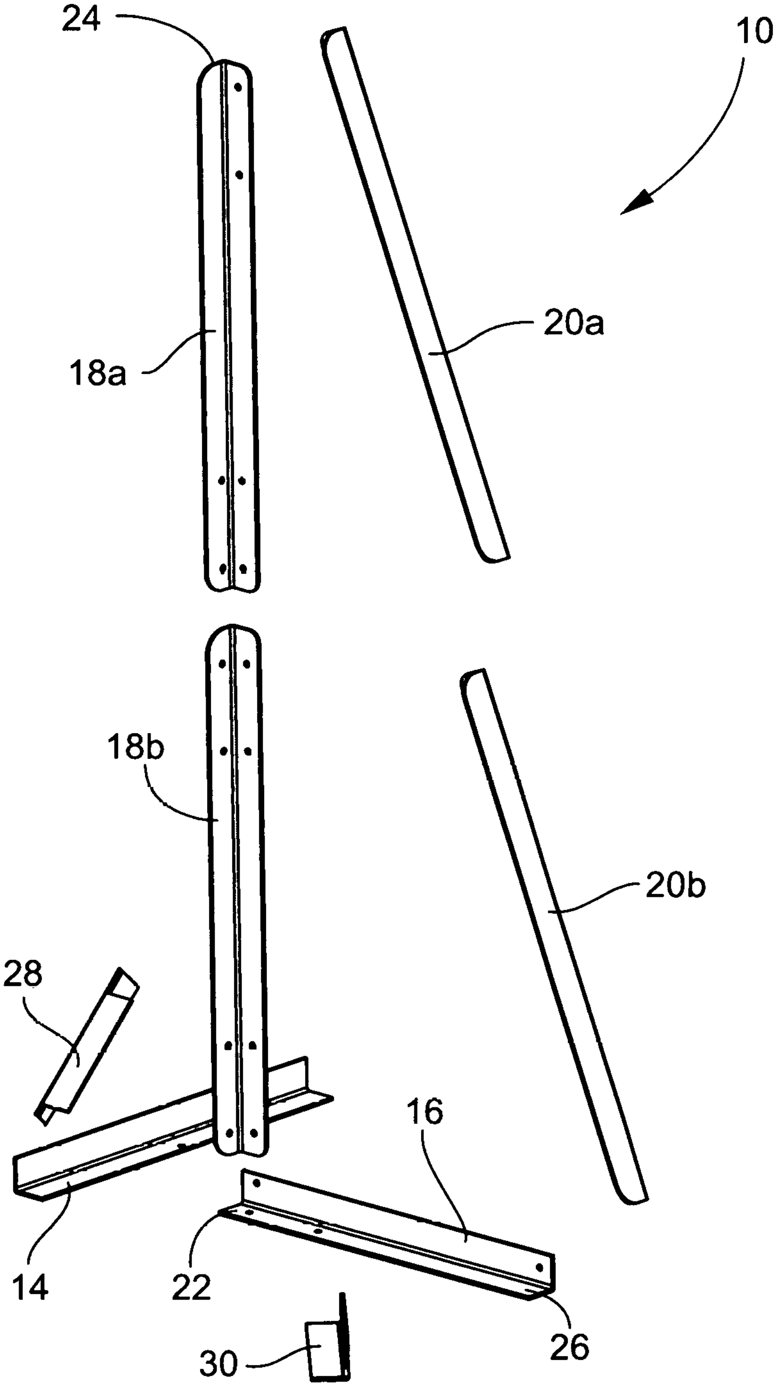
FIG. 6 is an exploded view of the apparatus of FIG. 1.
Figure 8:
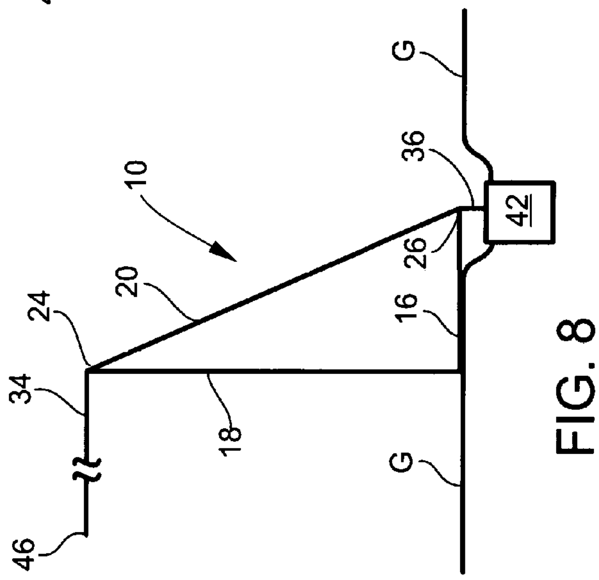
FIG. 8 is a schematic side view of the apparatus of FIG. 1 with a pull line and an explosive device connected to it.

FIG. 8 is a schematic side view of the apparatus 10 of FIG. 1 with a pull line 34 and an explosive device 42 connected to it. Pull line 34 has one (first) end fixed at the intersection of the second end 24 of the vertical upright member 18 and the diagonal member 20. Pull line 34 may be, for example, a pull line from an EOD Hook and Line (HAL) kit. Pull line 34 may include pulleys or other devices. The other (second) end 46 of pull line 34 is free and is located distal the vertical upright member 18. The other (second) end also known as the free end of line 34 is remote from apparatus 10 so that personnel pulling on line 34 will not be injured in case the explosive device 42 detonates while it is being pulled from the ground.

A connector 36 is configured to connect the apparatus 10 to the buried explosive device 42. Connector 36 may be, for example, a lanyard or a connector found in a HAL kit. Connector 36 is fixed at one (first) end to the intersection of the second end 26 of the web member 16 and the diagonal member 20. The other (second) end of connector 36 is fixed to the buried explosive device 42. The top of the buried explosive device 42 is uncovered, for example, by manual means, so that connector 36 may be fixed to explosive device 42.

Figure 9:
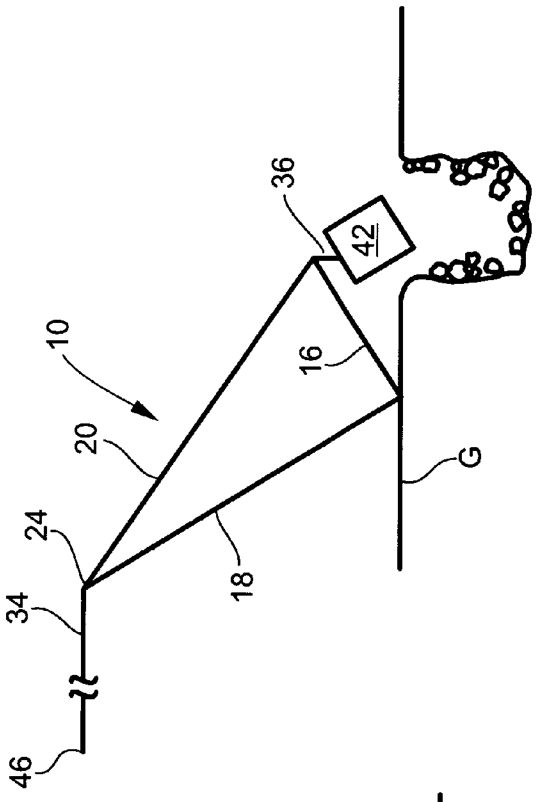
FIG. 9 is a schematic side view of the apparatus of FIG. 1 showing the explosive device lifted out of the ground.

The explosive device 42 that is disposed below the adjacent ground level G is fixed to the connector 36. As shown in FIG. 9, the pull force on pull line 34 causes the apparatus 10 to rotate (counterclockwise in FIG. 9), thereby lifting the explosive device 42 up to ground level without mechanical failure of the apparatus 10. Apparatus 10 functions as a lever having the form of a truss. In particular, apparatus 10 may lift an explosive device 42 having a weight up to about 400 pounds. Once explosive device 42 is out of the ground, the EOD operators may better evaluate how to disarm or otherwise render device 42 harmless.

Figure 10:
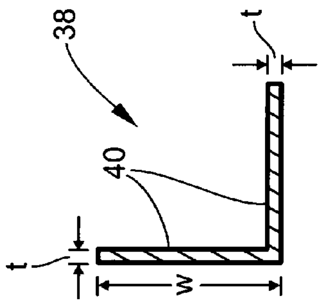
FIG. 10 is a cross-sectional view of an exemplary L-channel member.

The L-channel members include flange member 14, web member 16, vertical upright member 18, diagonal member 20 and braces 28, 30. FIG. 10 is a cross-sectional view of an exemplary L-channel member 38. Each L-channel member includes a pair of legs 40, 40 normal to each other. In one exemplary embodiment, the L-channel members all have the same thickness and cross-sectional area. The thickness t of each L-channel member may be in a range of about 0.085 inches to about 0.165 inches. More particularly, the thickness t is about 0.125 inches. In one embodiment, each leg is of the same width w. The width w may be in a range of about 1.0 inches to about 2.0 inches. More particularly, the width w of the equal width legs is about 1.5 inches.

A suitable example of carbon fiber L-channel has a tensile strength of 512 ksi and a tensile modulus of 33.4 Msi. Carbon fiber L-channel may be obtained from, for example, DragonPlate.com, Elbridge, N.Y., USA. The commercial off the shelf L-channel may be sold in 4 foot lengths.

Apparatus 10 is carried by the EOD operator, along with many other items. In one embodiment, apparatus 10 has a weight less than about 5 pounds. More particularly, apparatus 10 has a weight of no more than about 3 pounds. In one exemplary embodiment, the length of vertical upright member 18 is in the range of about 36-42 inches and the lengths of web member 16 and flange member 14 are in the range of about 16-21 inches. Because upright member 18 and diagonal member 20 may be made of sub-members 18*a*, 18*b* and 20*a*, 20*b*, the disassembled lengths of upright member 18 and diagonal member 20 are about one-half their respective assembled lengths. In terms of U.S. military applications, the back-packable length of the L-channel members is no more than about 24-30 inches. Advantageously, the L-channel members will nest together to save pack space.

Another advantage of apparatus 10 is the ability to configure the various L-channel members in other configurations that are useful to EOD operators, for example, a stand-off stick or disrupter stand. In addition, when multiple EOD operators each carry an apparatus 10, the L-channel members of the multiple apparatus may be combined to construct, for example, a ladder or a pedestrian bridge.

Any numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. An apparatus for lifting a buried explosive device, comprising:

a T-shaped base including a flange member and a web member, the web member includes one end fixed at a right angle to a midpoint of the flange member to form the T-shaped base;

a vertical upright member being fixed at one end to the midpoint of the flange member and normal to the plane of the T-shaped base, the vertical upright member includes a second end that is distal the T-shaped base;

a diagonal member being fixed at one end to the second end of the vertical upright member and being fixed at another end to a second end of the web member that is distal the flange member;

wherein the vertical upright member is at least twice a length of the web member, and wherein the flange member, the web member, the vertical upright member and the diagonal member are L-shaped channel members; and a first brace being fixed at one end to a lower half of the vertical upright member and being fixed at another end to one side of the flange member, wherein the first brace extends at an angle from the vertical upright member to the one side of the flange member.

2. The apparatus for lifting a buried explosive device of claim 1, further comprising a second brace being fixed at one end to an opposite side of the flange member from the first brace and being fixed at another end to the web member, the second brace extends at an angle from the flange member to the web member.

3. The apparatus of claim 2, wherein the vertical upright member and the diagonal member each comprise a plurality of sub-members fixed together.

4. The apparatus for lifting a buried explosive device of claim 1, further comprising a pull line including one end being fixed at an intersection of the second end of the vertical upright member and the diagonal member and another end located distal from the vertical upright member.

5. The apparatus for lifting a buried explosive device of claim 4, further comprising a connector being configured for connecting to the buried explosive device, the connector is fixed at an intersection of the second end of the web member and the diagonal member.

6. The apparatus of claim 1, wherein said each of the L shaped-channel members comprises a pair of equal width legs normal to each other.

7. An apparatus for lifting a buried explosive device, comprising:

a T-shaped base including a flange member and a web member, the web member includes one end fixed at a right angle to a midpoint of the flange member to form the T-shaped base;

a vertical upright member being fixed at one end to the midpoint of the flange member and normal to the plane of the T-shaped base, the vertical upright member includes a second end that is distal the T-shaped base;

a diagonal member being fixed at one end to the second end of the vertical upright member and being fixed at another end to a second end of the web member that is distal the flange member;

wherein the vertical upright member is at least twice a length of the web member, and wherein the flange member, the web member, the vertical upright member and the diagonal member are L-shaped channel members;

a pull line including one end being fixed at an intersection of the second end of the vertical upright member and the diagonal member and another end located distal from the vertical upright member; and a connector being configured for connecting to the buried explosive device, the connector is fixed at an intersection of the second end of the web member and the diagonal member, wherein, with the buried explosive device fixed to the connector and disposed below a ground level, a pull force on the pull line causes the apparatus to rotate and lifts the explosive device up to ground level without mechanical failure of the apparatus, when a force at the connector is up to about 400 pounds.

8. An apparatus for lifting a buried explosive device, comprising:

a lever in the form of a truss, the truss having a base configured to rest on a ground, one end of the base acting as a fulcrum for the lever and another end of the base configured for attachment to the buried explosive device, the truss including a vertical upright member fixed normal to the base at the one end of the base and a diagonal member extending from the other end of the base to a top of the vertical upright member wherein the truss is made of a plurality of L channel members comprising carbon fiber.

9. The apparatus for lifting a buried explosive device of claim 8, wherein the truss is operable to withstand a force of up to about 400 pounds, measured at the end of the base configured for attachment to the buried explosive device.

10. The apparatus for lifting a buried explosive device of claim 8, wherein the base is a T-shaped base, which includes a flange member and a web member, and wherein the web member includes one end fixed at a right angle to a midpoint of the flange member to form the T-shaped base.

11. The apparatus for lifting a buried explosive device of claim 8, wherein the base is a T-shaped base, which includes a flange member and a web member, wherein the web member includes one end fixed at a right angle to a midpoint of the flange member to form the T-shaped base, and wherein the vertical upright member is fixed at one end to the midpoint of the flange member and the diagonal member is fixed at one end to the top of the vertical upright member and fixed at another end to a second end of the web member that is distal the flange member.

12. The apparatus for lifting a buried explosive device of claim 11, wherein the vertical upright member is at least twice a length of the web member.

13. The apparatus for lifting a buried explosive device of claim 8, wherein each of the plurality of L-channel members comprises a pair of equal width legs normal to each other.

* * * * *